(12) United States Patent
Watanabe et al.

(10) Patent No.: US 12,072,285 B2
(45) Date of Patent: Aug. 27, 2024

(54) MEASURING JIG, AND CALIBRATION METHOD AND TERAHERTZ WAVE MEASURING METHOD USING SAME

(71) Applicant: FEMTO Deployments Inc., Okayama (JP)

(72) Inventors: Akira Watanabe, Okayama (JP); Tadashi Okuno, Okayama (JP); Takeji Ueda, Okayama (JP)

(73) Assignee: FEMTO Deployments Inc., Okayama (JP)

( * ) Notice: Subject to any disclaimer, the term of this patent is extended or adjusted under 35 U.S.C. 154(b) by 295 days.

(21) Appl. No.: 17/770,394

(22) PCT Filed: Apr. 1, 2021

(86) PCT No.: PCT/JP2021/014188
§ 371 (c)(1),
(2) Date: Apr. 20, 2022

(87) PCT Pub. No.: WO2021/201237
PCT Pub. Date: Oct. 7, 2021

(65) Prior Publication Data
US 2022/0390364 A1 Dec. 8, 2022

(30) Foreign Application Priority Data
Apr. 3, 2020 (JP) ................. 2020-067788

(51) Int. Cl.
*G01N 21/3586* (2014.01)
*G01N 21/03* (2006.01)
*G01N 21/27* (2006.01)

(52) U.S. Cl.
CPC ......... *G01N 21/3586* (2013.01); *G01N 21/03* (2013.01); *G01N 21/274* (2013.01); *G01N 2021/0307* (2013.01)

(58) Field of Classification Search
CPC .. G01N 21/3586; G01N 21/03; G01N 21/274; G01N 2021/0307
See application file for complete search history.

(56) References Cited

U.S. PATENT DOCUMENTS 11,143,590 B2 * 10/2021 Hofeldt .............. G01N 21/3586

FOREIGN PATENT DOCUMENTS

| CN | 102645404 A | 8/2012 |
|---|---|---|
| CN | 202794017 U | 3/2013 |

(Continued)

OTHER PUBLICATIONS

Partial European Search Report issued on Mar. 5, 2024 for corresponding European Patent Application No. 21779077.3.

*Primary Examiner* — David P Porta
*Assistant Examiner* — Fani Polyzos Boosalis
(74) *Attorney, Agent, or Firm* — POLSINELLI PC (57) ABSTRACT

The invention is configured to include a spectroscopy cell 100 as a container including one or more spaces, each of which has a plate shape and contains a to-be-measured object that transmits or reflects a terahertz wave; and a holder 6 including one or more first holder through-holes 6b and 6c disposed at positions corresponding to the spaces of the spectroscopy cell 100, each of the spaces containing the to-be-measured object. A body portion 1 of the spectroscopy cell 100 is made of a resin material that transmits the terahertz wave, and the spectroscopy cell 100 is loaded into the holder 6 and is used. The holder 6 has a function of holding the spectroscopy cell 100, and a function of correcting one or more of a distortion, a twist, and a bending of the spectroscopy cell 100.

16 Claims, 9 Drawing Sheets

(56) References Cited

FOREIGN PATENT DOCUMENTS

| | | |
|---|---|---|
| CN | 103616337 A | 3/2014 |
| JP | 2008051533 A | 3/2008 |
| JP | 2010071660 A | 4/2010 |
| JP | 2010078544 A | 4/2010 |
| JP | 2011-127950 A | 6/2011 |
| JP | 2017-078599 A | 4/2017 |

* cited by examiner

MEASURING JIG, AND CALIBRATION METHOD AND TERAHERTZ WAVE MEASURING METHOD USING SAME

CROSS REFERENCE TO RELATED APPLICATIONS

This application is a National Phase filing under 35 U.S.C. § 371 of PCT/JP2021/014188 filed on Apr. 1, 2021; which application in turn claims priority to Application No. 2020-067788 filed in Japan on Apr. 3, 2020. The entire contents of each application are hereby incorporated by reference.

TECHNICAL FIELD

The present invention relates to a measuring jig, and a calibration method and a terahertz wave measuring method using the same, particularly to a measuring jig, and a calibration method and a terahertz wave measuring method using the measuring jig when a to-be-measured object is disposed in a propagation path of a terahertz wave and characteristics of the terahertz wave which has transmitted through or reflected by the to-be-measured object are measured.

BACKGROUND ART

An electromagnetic wave is called an ultraviolet ray, an infrared ray, a terahertz wave, a microwave, or the like depending on the wavelength thereof. One technique for measuring various characteristics of a substance using an electromagnetic wave is called spectroscopic measurement or spectroscopy, and the measuring apparatus is called a spectroscopy apparatus. Measurable characteristics vary greatly depending on a wavelength region of the electromagnetic wave used here. For example, regarding characteristics of molecules, an electronic state, a vibration and rotation state of molecules, a rotation state of the electric dipole of molecules, and interaction between molecules can be observed with an ultraviolet ray, an infrared ray, and a microwave, and in a terahertz wave region, respectively. Accordingly, spectroscopic measurement in a terahertz wave region is suitable for when a liquid of which a state is dominated by interaction between molecules is measured.

In the spectroscopy, physical and chemical properties of a sample are measured from a change in electromagnetic wave caused by interaction between an electromagnetic wave and the sample when the electromagnetic wave is incident on the sample and passes therethrough or is reflected thereby. In the spectroscopy apparatus using such an electromagnetic wave, the apparatus or results output from the apparatus are adjusted such that the reproducibility of the measurement results of the same sample under the same conditions is guaranteed and the results are as true as possible. This is referred to as calibration. Generally, in the calibration, data output from the apparatus using a standard device or standard sample serving as a reference, and data of a standard device or standard sample known in advance are compared to each other to correct a difference therebetween.

In the measurement of a liquid sample, as one example, the sample is to be contained in a container (generally, called a spectroscopy cell) made of a material that transmits an electromagnetic wave, an electromagnetic wave is incident from the outside of the spectroscopy cell, and the transmitted, reflected, or scattered electromagnetic wave is measured.

Generally, spectroscopic measurement of a liquid sample using an electromagnetic wave in a terahertz wave region requires a spectroscopy cell that contains the liquid sample in order to measure the electromagnetic waves under the condition that the temperature and shape of the liquid sample are always constant. In this case, important necessary conditions for the spectroscopy cell are that the material of the spectroscopy cell sufficiently transmits a terahertz wave and the shape thereof is stable. Further, when a human performs liquid sample filling work, in consideration of workability, the material requires having transparency in a visible light region that allows visual confirmation of a process of filling the spectroscopy cell with the liquid.

Resin is an inexpensive material that satisfies such conditions and can be industrially mass produced. As a problem of spectroscopy cells made of a resin material, gap spacings (hereinafter, referred to as cell gap thicknesses) inside the spectroscopy cells which are filled with a liquid sample and which are the most basic performance of the spectroscopy cells are individually deformed for reasons such as an entire structure of the spectroscopy cells being bent because of the spectroscopy cells being made of the resin material, and the cell gap thickness varies, so that measurement data of the to-be-measured sample is not constant and varies among the individual spectroscopy cells. Even when the liquid sample in the same state is measured, there is a high possibility that results are changed, which is a major problem in terms of measurement reproducibility.

As one example of a measuring method of a terahertz wave spectroscopy apparatus, Patent Document 1 describes a method for measuring a difference between a to-be-measured sample and a reference sample by splitting one terahertz wave beam into two beams and by disposing the reference sample on the other side and disposing the to-be-measured sample on one side. This optical system is capable of detecting only the difference with higher sensitivity by causing the terahertz wave beams after passing through the reference sample and the to-be-measured sample to interfere with each other. In this case, when characteristics of spectroscopy cells such as a cell gap thickness which are filled with the reference sample and the to-be-measured sample are the same, it can be said that a detected difference accurately represents a difference in characteristics between the samples. However, when there is a difference in characteristics between the spectroscopy cells due to various factors, the difference between the spectroscopy cells is reflected in measurement results, and the measurement results are inaccurate, which is a problem.

As one measuring method of the terahertz wave spectroscopy apparatus, Patent Literature 2 describes a method for performing terahertz wave measurement using a spectroscopy cell made of a glass plate. Since the transmission of the typical glass for a terahertz wave is poor, the spectroscopy cell is made of a glass plate of a thinner thickness but the thin glass is fragile, and when a manual operation is performed during filling of a to-be-measured object, the operability becomes poor, which is a problem.

CITATION LIST

Patent Document

Patent Document 1: JP-A-2017-78599
Patent Document 2: JP-A-2011-127950

SUMMARY OF THE INVENTION

Technical Problem

The invention is conceived to solve such problems, and an object of the invention is to perform highly accurate terahertz measurement.

Solution to Problem

In order to solve the above-described problems, according to an aspect of the invention, there is provided a measuring jig including: a spectroscopy cell including one or more spaces, each of which has a plate shape and contains a to-be-measured object that transmits or reflects a terahertz wave; and a holder including one or more first holder through-holes disposed at positions corresponding to the spaces of the spectroscopy cell, each of the spaces containing the to-be-measured object. The spectroscopy cell is made of a resin material that transmits the terahertz wave, and the spectroscopy cell is loaded into the holder and is used. The holder has a function of holding the spectroscopy cell, and a function of correcting one or more of a distortion, a twist, and a bending of the spectroscopy cell.

Advantageous Effects of the Invention

According to the invention configured as described above, a bending of the spectroscopy cell can be mechanically corrected which are caused by plurality of factors such as bending generated during production of resin products, aging generated during storage of resin products or the other factors. Accordingly, a cell gap thickness inside the spectroscopy cell is guaranteed, and accurate spectroscopic information of a sample can be measured.

BRIEF DESCRIPTION OF THE DRAWINGS

FIG. 2(a) illustrates an overall exterior view, and FIG. 2(b) illustrates a cross-sectional view.

FIG. 5(a) illustrates an overall exterior view, and FIG. 5(b) illustrates a cross-sectional view.

FIG. 6(a) illustrates overall exterior example 1, FIG. 6(b) illustrates overall exterior example 2, and FIG. 6(c) illustrates a cross-sectional view.

FIG. 11(a) illustrates overall exterior example 1, FIG. 11(b) illustrates overall exterior example 2, and FIG. 11(c) illustrates a cross-sectional view.

FIG. 12(a) illustrates a front view, and FIG. 12(b) illustrates a cross-sectional view.

MODE FOR CARRYING OUT THE INVENTION

Figure 1:
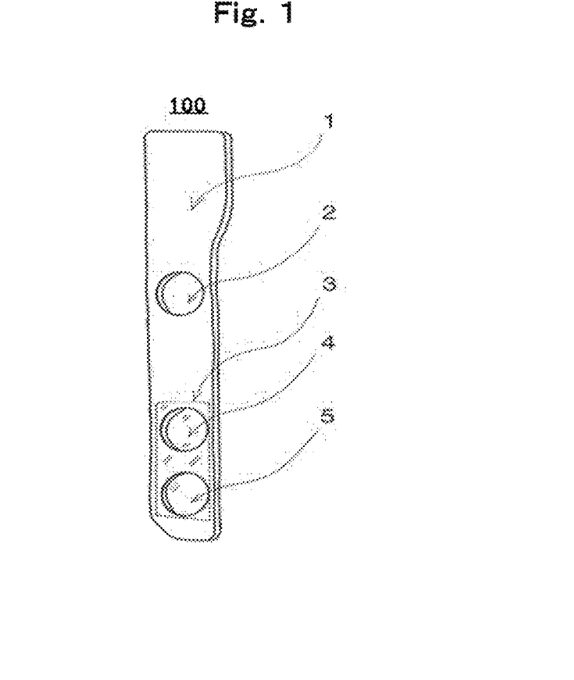
FIG. 1 is a view illustrating an example of an external shape of a spectroscopy cell.
Figure 2:
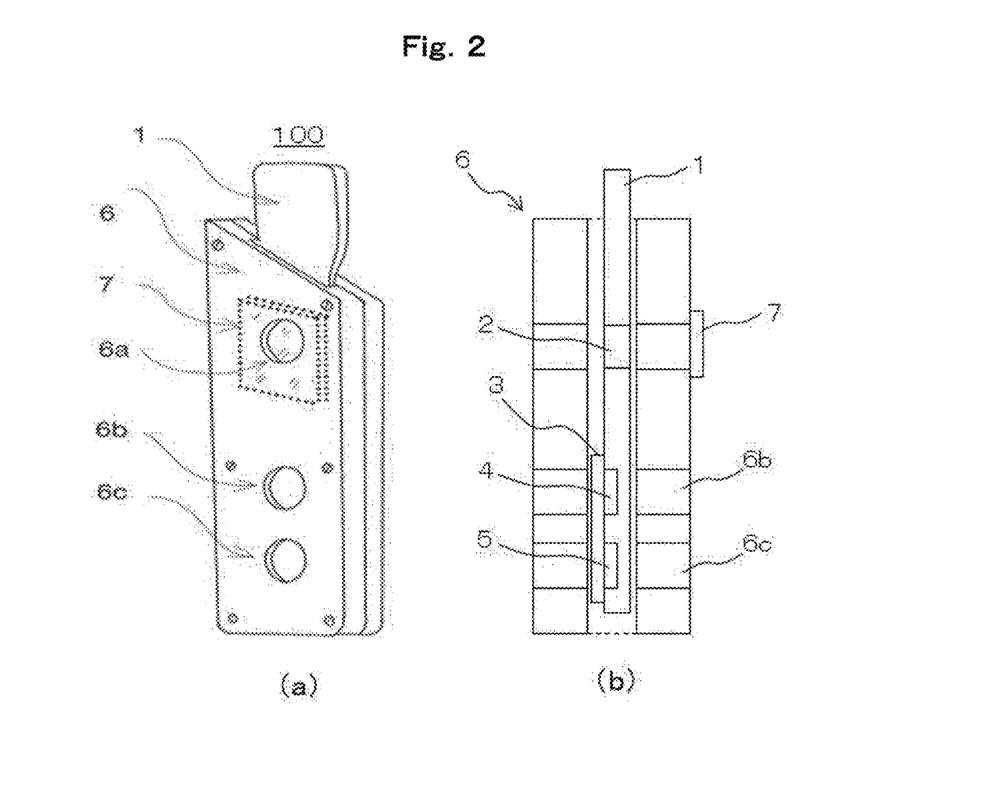
FIG. 2 illustrates a combination of the spectroscopy cell and a holder.
Figure 4:
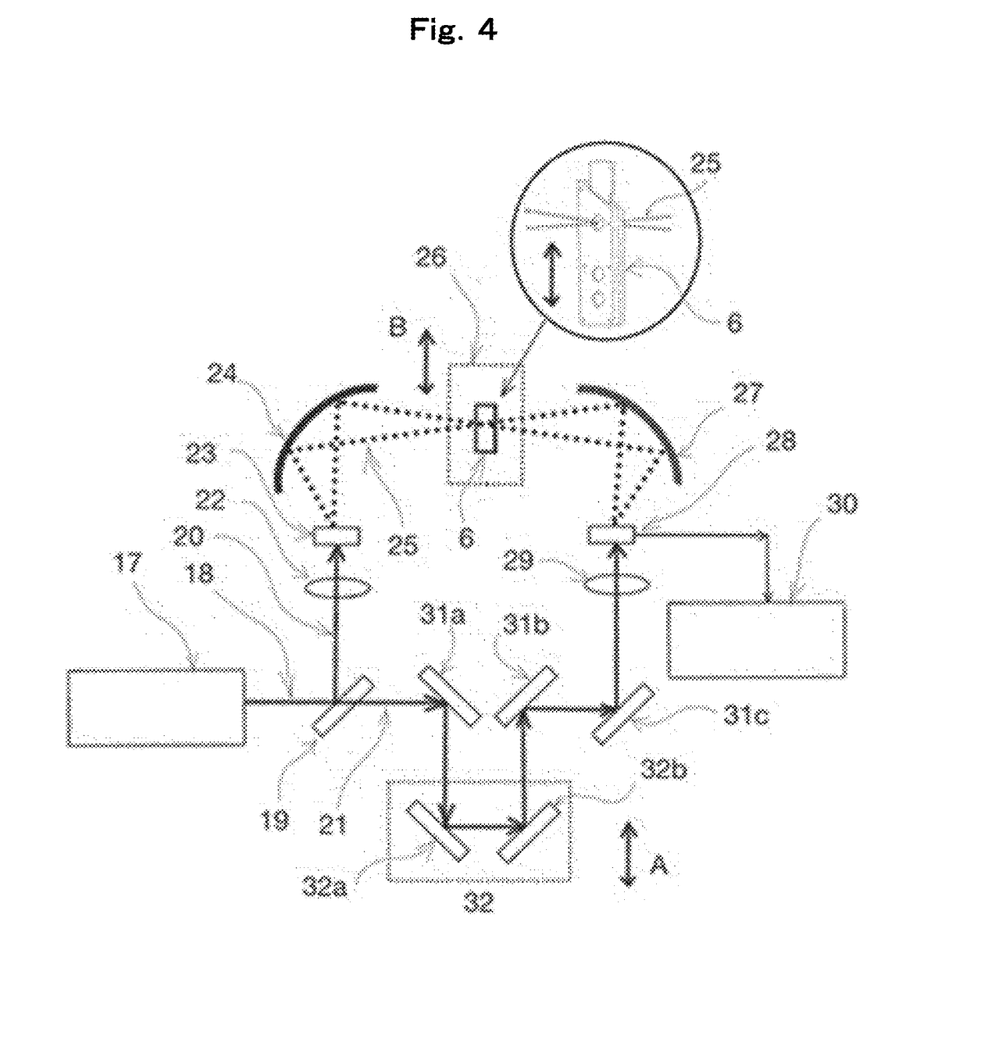
FIG. 4 is a view illustrating an example of a structure of a terahertz wave spectroscopy apparatus.

Hereinafter, one embodiment of the invention will be described with reference to the drawings. FIG. 1 is a view illustrating an example of an external shape of a spectroscopy cell 100 to be used in a terahertz wave spectroscopy apparatus according to the present embodiment. In the present embodiment, the spectroscopy cell 100 filled with a liquid sample is used in combination with a holder as illustrated in FIG. 2. The spectroscopy cell 100 combined with the holder is disposed in a propagation path of a terahertz wave as illustrated in FIG. 4, and characteristics of the liquid sample are measured from the terahertz wave that has transmitted through the liquid sample. Examples of the liquid sample described here include various liquids such as a saline solution and a silicone oil. The terahertz wave absorption coefficient varies depending on the characteristics of the liquid sample, and a cell gap thickness of the spectroscopy cell suitable for measurement may be selected.

As means for solving the above problems, in order to secure a function of being capable of visually confirming liquid filling work, and to make measurement possible by allowing the transmission of the terahertz wave, a material forming the spectroscopy cell 100 needs to be transparent in a visible light region. Therefore, a filling amount in the spectroscopy cell 100 can be confirmed visually or with a visible camera during filling work, and terahertz wave measurement can be performed. Glass can be provided as an example of the material, but since the terahertz wave absorption of the glass is not small, the thickness of a plate needs to be made thin in order to secure sufficient transmission for measurement, and in that case, the plate is fragile and is difficult to handle. Accordingly, materials satisfying these conditions including the ease of handling are some resin materials, and the problems can be solved by producing the spectroscopy cell 100 using the resin materials. Examples of the resin material include cycloolefin polymer, polymethylpentene, and the like.

However, as described above, when the spectroscopy cell 100 is made of a resin, the spectroscopy cell 100 is likely to be deformed such as being bent, so that as illustrated in FIG. 2, a holder 6 is invented to correct one or more of a distortion, a twist, and a bending of the spectroscopy cell 100 that is resin-molded.

This mechanism can improve a variation in spectroscopic measurement data which is generated by an individual change of the cell gap thicknesses of portions inside the spectroscopy cell 100 which are filled with the liquid sample, the individual change being caused by an individual distortion or deformation of the spectroscopy cell 100. In addition, in order to improve convenience, the holder 6 is invented together with a mechanism that has a function of attaching and detaching the spectroscopy cell 100 and that causes the spectroscopy cell 100 and the holder 6 to be always combined and used in the terahertz wave spectroscopy apparatus.

In addition, as illustrated in FIG. 2, an object (hereinafter, referred to as a terahertz wave absorbing object 7) that absorbs a certain amount of a terahertz wave is disposed in a part of the holder 6. The terahertz wave absorption amount of the terahertz wave absorbing object 7 is known or can be computed from calculation or the like. In that case, by measuring the terahertz wave absorbing object 7 at the same time as, before, or after the measurement of a to-be-measured object such as a liquid, calibration can be performed by an entire measuring system including the terahertz wave spectroscopy apparatus, a measuring jig, and a computer (not illustrated) at the same time as, before, or after the measurement. Namely, calibration can be performed each time the to-be-measured object is measured, and more accurate measurement can be performed.

A terahertz signal of the to-be-measured object such as a liquid measured by the terahertz wave spectroscopy apparatus and a terahertz signal of the terahertz wave absorbing object 7 measured by the terahertz wave spectroscopy apparatus at the same time as, before, or after the measurement of the to-be-measured object are supplied to the computer (not illustrated). Then, the computer performs a process including calibration, and characteristics of the to-be-measured object are analyzed from amplitude or phase information of each frequency of a terahertz wave. At this time, calibration is performed using at least one of a transmittance, a reflectance, a phase difference, an intensity, and a phase as a calibration amount. Particularly, in the present embodiment, calibration is performed using three terahertz signals measured by causing a terahertz wave to transmit through each of three spectroscopy cell windows 2, 4, and 5 (details will be described later) of the spectroscopy cell 100, so that calibration can also be performed based on not only a linear function but also a non-linear function.

In addition, when the terahertz wave absorbing object is formed of an absorbing object having a photonic structure, an absorption characteristic thereof can be artificially designed, and a configuration suitable for a measurement target such as frequency band or absorption region can be implemented. According to this, the terahertz wave absorbing object 7 can be designed according to a to-be-measured sample, and is effective means when a suitable standard device or standard sample is not available.

Figure 3:
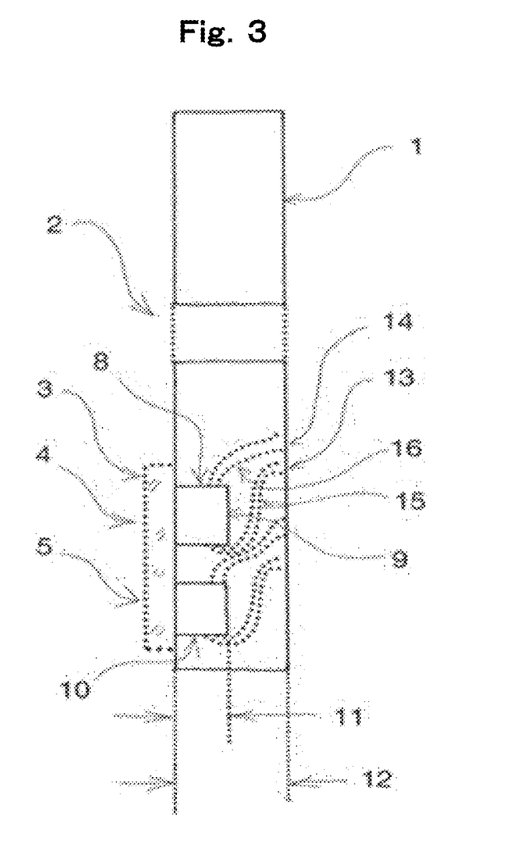
FIG. 3 is a view illustrating an example of a cross-sectional structure of the spectroscopy cell.

As illustrated in FIG. 1, the spectroscopy cell 100 includes a spectroscopy cell body portion 1 that is a base of mechanical strength; the spectroscopy cell window 2 (corresponding to a cell through-hole in the claims), the spectroscopy cell window 4, and the spectroscopy cell window 5 through each of which a terahertz wave passes; and a spectroscopy cell window cover plate 3. FIG. 3 illustrates one example of a cross-sectional view of the spectroscopy cell 100.

Based on the assumption of resin molding that is inexpensive and facilitates mass production, the spectroscopy cell body portion 1 is resin-molded in a shape in which a plate of a thickness 12 includes a recess for a liquid filling portion 8 having a uniform depth and a recess for a liquid filling portion 10 having the same uniform depth as that of the liquid filling portion 8 and includes a through-hole 2. The spectroscopy cell window cover plate 3 is in close contact with and bonded to a surface on a spectroscopy cell body portion 1 side in parallel thereto. When the spectroscopy cell 100 is produced in such a manner, a cell gap thickness 11 between the spectroscopy cell window cover plate 3 and a bottom surface 9 of the liquid filling portion 8 becomes a liquid fillable thickness, and the liquid filling portion 8 can be filled with the liquid. The liquid filling portion 10 covered with the same spectroscopy cell window cover plate 3 can also be filled with the liquid. According to such production, the same uniform cell gap thickness 11 of each of the spectroscopy cell window 4 and the spectroscopy cell window 5 can be secured within a range of molding accuracy. One ends of a flow path 15 and a flow path 16 formed inside the spectroscopy cell body portion 1 are connected to a liquid inlet 13 and an air vent hole 14, and the other ends are connected to the liquid filling portion 8 in the spectroscopy cell window 4. Similarly, the liquid filling portion 10 in the spectroscopy cell window 5 is also connected to a liquid inlet and an air vent hole via two flow paths. The liquid filling portions 8 and 10 correspond to a "space that has a plate shape and contains a to-be-measured object" in the claims.

The materials of the spectroscopy cell body portion 1 and the spectroscopy cell window cover plate 3 need to transmit sufficiently a terahertz wave. Further, in the case where a human visually confirms liquid filling, either one or both of the materials of the spectroscopy cell body portion 1 and the spectroscopy cell window cover plate 3 allow not only the transmission of a terahertz wave but also transmission in the visible light region. Certainly, in the case where liquid filling is confirmed with a camera or the like, transmission in a wavelength region observable by the camera may be good. Note that the spectroscopy cell window cover plate 3 and the spectroscopy cell body portion 1 are bonded to each other at locations other than the spectroscopy cell windows 4 and 5 using fusion or an adhesive.

Cycloolefin polymer, polymethylpentene, and the like are provided as one example of the resin material, and the spectroscopy cell 100 is produced using these resin materials. In addition, various surface treatments for hydrophilicity and hydrophobicity, low protein adsorption, or the like are applied to a portion of the resin material which comes into contact with the liquid to provide surface functions conforming to properties of the liquid such as the ease of inputting the liquid into the filling portion and the suppression of deterioration of the filled liquid. Therefore, stable terahertz wave measurement can be performed.

FIG. 2 illustrates one example in which the spectroscopy cell body portion 1 is loaded into the holder 6. The holder 6 is provided to have a function of correcting a distortion of the spectroscopy cell body portion 1. Details of the function will be described later in a description of FIG. 7. A holder window 6a, a holder window 6b, and a holder window 6c each of which is a through-hole (the holder window 6a corresponds to a second holder through-hole in the claims, and the holder windows 6b and 6c correspond to a first holder through-hole in the claims) are present in a side surface of the holder 6, and are provided such that the positions thereof coincide with the positions of the spectroscopy cell window 2, the spectroscopy cell window 4, and the spectroscopy cell window 5, respectively. Further, since the spectroscopy cell 100 is a medium transparent to a terahertz wave, when the terahertz wave comes into contact with an outer edge of the spectroscopy cell window 2, the spectroscopy cell window 4, the spectroscopy cell window 5, or the like, complicated diffracted light is generated to interfere with the accuracy or reproducibility of measurement. Accordingly, it is preferable that the holder window 6a, the holder window 6b, and the holder window 6c are smaller than the spectroscopy cell window 2, the spectroscopy cell window 4, and the spectroscopy cell window 5, respectively. In this case, it is preferable that the material of the holder 6 is metal or the like which is not transparent to a terahertz wave, and it is preferable that edges of the holder window 6a, the holder window 6b, and the holder window 6c are devised to prevent the generation of diffraction (for example, corners have a rounded shape). The terahertz wave absorbing object 7 may be provided outside the holder window 6a, or may be provided inside the holder so as not to interfere mechanically with the spectroscopy cell body portion 1.

FIG. 4 illustrates one example of a configuration of the terahertz wave spectroscopy apparatus. The terahertz wave spectroscopy apparatus is configured to include a femtosecond laser light source 17, a laser light splitter 19, a condensing lens 22, a terahertz wave generating semiconductor 23, a terahertz wave focusing unit 24, a holder movable unit 26, a terahertz wave focusing unit 27, a terahertz wave detecting semiconductor 28, a condensing lens 29, a terahertz signal detecting device 30, reflective mirrors 31a, 31b, and 31c, and a variable optical delay unit 32 for time delay.

The laser light splitter 19 splits a laser light (femtosecond laser pulse) emitted from the femtosecond laser light source 17 into two lights such as a pump light 20 that operates the terahertz wave generating semiconductor 23 that is a terahertz wave light source, and a sampling light 21 that is incident on the terahertz wave detecting semiconductor 28 which is a terahertz wave detecting unit to increase a very weak current generated by the terahertz wave. Specifically, the laser light splitter 19 is formed of a semi-transmissive mirror.

A terahertz wave 25 generated from the terahertz wave generating semiconductor 23 is focused in any one of the spectroscopy cell windows 2, 4, and 5 of the spectroscopy cell body portion 1 mounted on the holder 6 by the terahertz wave focusing unit 24 formed of a condensing mirror. Details of the spectroscopy cell window 2, the spectroscopy cell window 4, and the spectroscopy cell window 5 at three locations and the focused terahertz wave will be described later. In addition, although not illustrated, in order to confirm the installation of the spectroscopy cell 100 with high visibility, an LED light is installed in the terahertz wave generating semiconductor 23, the terahertz wave detecting semiconductor 28, or the holder movable unit 26, so that it is also possible to provide a function of causing an upper portion of the spectroscopy cell body portion 1 to appear to shine when the spectroscopy cell body portion 1 is loaded into the holder 6.

A condensing mirror 27a of the terahertz wave focusing unit 27 focuses the terahertz wave, which has transmitted through the spectroscopy cell body portion 1, on the terahertz wave detecting semiconductor 28.

The terahertz wave detecting semiconductor 28 detects the terahertz wave focused by the terahertz wave focusing unit 27, and outputs a terahertz wave signal current representing a waveform of the terahertz wave. The terahertz signal detecting device 30 detects the terahertz wave signal current, and performs Fourier transformation on the detected signal to obtain amplitude and phase information of each frequency of the terahertz wave.

The variable optical delay unit 32 for time delay is provided in a propagation path of the sampling light 21 that is one laser light split by the laser light splitter 19, and variably sets the amount of a delay in the time it takes for the sampling light to reach the terahertz wave detecting semiconductor 28. The variable optical delay unit 32 for time delay includes two reflective mirrors 32a and 32b that are movable with respect to the reflective mirrors 31a, 31b, and 31c that are fixed, and the reflective mirrors 32a and 32b are configured to be physically movable parallel to a direction of arrow A. Accordingly, a delay time of the sampling light is variable. The variable optical delay unit 32 for time delay is used to measure a time waveform of the terahertz wave while shifting a timing the sampling light reaches the terahertz wave detecting semiconductor 28.

The holder movable unit 26 is physically movable parallel to a direction of arrow B, and is movably controlled by the computer such that the terahertz wave beam is capable of passing through the position of each of the holder window 6a, the holder window 6b, and the holder window 6c of the holder 6. The controlling computer is not included in FIG. 4.

Next, a case where the spectroscopy cell 100 in which each of the liquid filling portions 8 and 10 is filled with a sample liquid is mounted on the holder 6 will be taken as an example to describe a relationship between the holder window 6a, the holder window 6b, and the holder window 6c, the spectroscopy cell window 2, the spectroscopy cell window 4, and the spectroscopy cell window 5 of the spectroscopy cell body portion 1, and the focused terahertz wave.

The spectroscopy cell 100 and the holder 6 are produced such that the centers of the holder window 6a, the holder window 6b, and the holder window 6c of the holder 6 coincide with the centers of the spectroscopy cell window 2, the spectroscopy cell window 4, and the spectroscopy cell window 5 of the spectroscopy cell body portion 1, respectively, in a state where the spectroscopy cell 100 is mounted on the holder 6.

When the holder movable unit 26 is moved and a terahertz wave is focused in the holder window 6a, the terahertz wave passes through the terahertz wave absorbing object 7 installed on the side surface of the holder 6, and passes through the spectroscopy cell window 2. In this case, since the spectroscopy cell window 2 is hollow as illustrated in FIG. 1, characteristics of only the terahertz wave absorbing object 7 are measured through the terahertz wave that has passed through the terahertz wave absorbing object 7.

Next, when the holder movable unit 26 is moved and a terahertz wave is focused in the holder window 6b, the terahertz wave passes through the spectroscopy cell window 4. In this case, since the focused terahertz wave passes through the liquid filling portion 8 filled with the sample liquid, characteristics of the sample liquid with which the liquid filling portion 8 is filled are measured through the terahertz wave that has passed through the spectroscopy cell window 4.

Next, when the holder movable unit 26 is moved and a terahertz wave is focused in the holder window 6c, the terahertz wave passes through the spectroscopy cell window 5. In this case, since the focused terahertz wave passes through the liquid filling portion 10 filled with the sample liquid, characteristics of the sample liquid with which the liquid filling portion 10 is filled are measured through the terahertz wave that has passed through the spectroscopy cell window 5.

As described above, two sample liquids with which the terahertz wave absorbing object 7 and the spectroscopy cell body portion 1 are filled are measured while controlling the holder movable unit 26, so that calibration data and sample liquid data can be acquired without a time lag. For this reason, measurement or correction can be performed while minimizing a measurement deviation due to noise or drift of the apparatus or slight noise or the like caused by the measuring jig, so that highly accurate data of the liquid samples is obtained.

Figure 5:
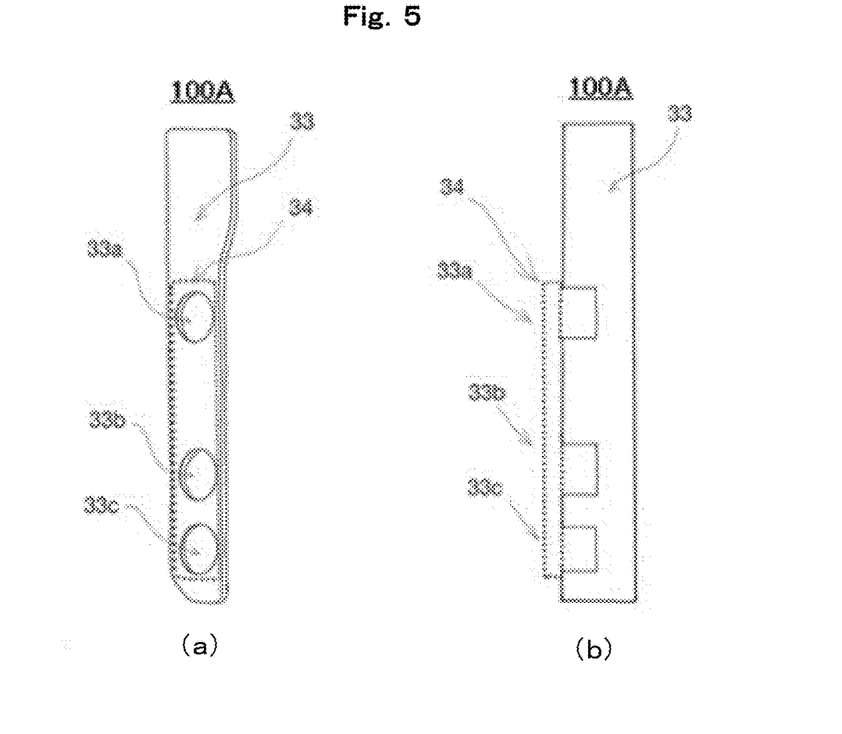
FIG. 5 illustrates an example of a spectroscopy cell.

FIG. 5 illustrates an example of another form of a spectroscopy cell 100A. The material and the external dimensions of a spectroscopy cell body portion 33 illustrated in FIG. 5 are the same as those of the spectroscopy cell body portion 1 illustrated in FIGS. 1 and 3, and a spectroscopy cell window 33a is not hollow and has the same structure as that of the spectroscopy cell window 4. Spectroscopy cell windows 33b and 33c have the same structures of the spectroscopy cell windows 4 and 5, respectively. In addition, a spectroscopy cell window cover plate 34 is longer than the spectroscopy cell window cover plate 3, covers the three spectroscopy cell windows 33a, 33b, and 33c, and forms a space inside the spectroscopy cell window 33a which can be also filled with a solution. FIG. 5(b) illustrates a cross-sectional view of the spectroscopy cell 100A. Although not illustrated in FIG. 5(b), in the spectroscopy cell 100A, the same configurations as the flow path 15, the flow path 16, the liquid inlet 13, and the air vent hole 14 of FIG. 3 are provided, and are connected to the spectroscopy cell window 33a, the spectroscopy cell window 33b, and the spectroscopy cell window 33c. In addition, the spectroscopy cell window 33a can be used with a liquid sample sealed therein.

Since such a structure as the spectroscopy cell body portion 33 is employed, the spectroscopy cell window 33a can be filled with a liquid having a complex permittivity (or absorption coefficient, refractive index, or the like) characteristic known in a terahertz wave frequency band which can be a reference, and has the same function as that of the terahertz wave absorbing object 7 made of a solid material and mounted on the holder 6, and similarly as described above, calibration can be performed immediately before the measurement of the liquid sample.

Figure 6:
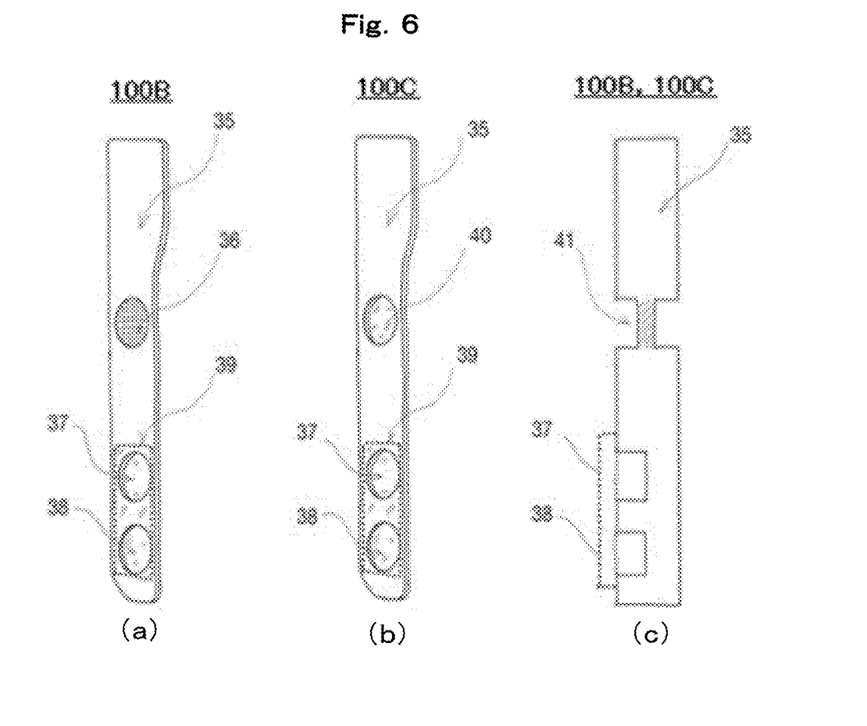
FIG. 6 illustrates examples of spectroscopy cells.

FIG. 6 illustrates spectroscopy cells 100B and 100C having other structures. FIG. 6(c) illustrates a cross-sectional view of the spectroscopy cells 100B and 100C. The material and the external dimensions of a spectroscopy cell body portion 35 illustrated in FIG. 6(a) are the same as those of the spectroscopy cell body portion 1 illustrated in FIGS. 1 and 3, and a spectroscopy cell window 36 is not hollow and is formed of an absorption reference portion 41 as illustrated in FIG. 6(c). A spectroscopy cell window 37 and a spectroscopy cell window 38 have the same structures of the spectroscopy cell windows 4 and 5, respectively. Each of the spectroscopy cells 100B and 100C includes flow paths, a liquid inlet, an air vent hole, and the like similarly to FIG. 3, and an illustration thereof is omitted.

In the spectroscopy cell window 36 illustrated in FIG. 6(a), the absorption reference portion 41 has a photonic crystal structure molded of the same resin as a material molding the spectroscopy cell body portion 35. Since the photonic crystal structure is formed, in spectroscopic data from a terahertz wave passing through this portion, specific indexes can be assigned to a frequency axis, a transmittance axis, and a phase axis different from an absorption characteristic and a phase characteristic dependent on the molding material by the design of a geometric groove pattern to be formed in the absorption reference portion 41. As a result, the spectroscopy cell window 36 has the same function as that of the terahertz wave absorbing object 7 made of a solid material and mounted on the holder 6, and similarly as described above, calibration can be performed immediately before the measurement of a liquid sample.

The case of molding with the same resin has been described above; however, certainly, as long as the same characteristics are obtained by adjusting the photonic crystal structure, molding may be performed with different types of resins, and is not limited to being performed with the same resin material. Further, since the material of the photonic crystal structure may be a metal having geometric holes, the material is not limited to the resin. In addition, the case has been described above in which a geometric structure is created with a groove pattern to form photonic crystals; however, the photonic crystal structure may be such that spheres having different refractive indexes such as air are disposed in the resin, and the photonic crystal structure is not limited to the geometric groove pattern.

In the spectroscopy cell window 40 illustrated in FIG. 6(b), the absorption reference portion 41 has a structure molded of the same resin as a material molding the terahertz wave absorbing object 7. As a result, the spectroscopy cell window 40 has the same function as that of the terahertz wave absorbing object 7 made of a solid material and mounted on the holder 6, and similarly as described above, calibration can be performed immediately before the measurement of a liquid sample.

Figure 7:
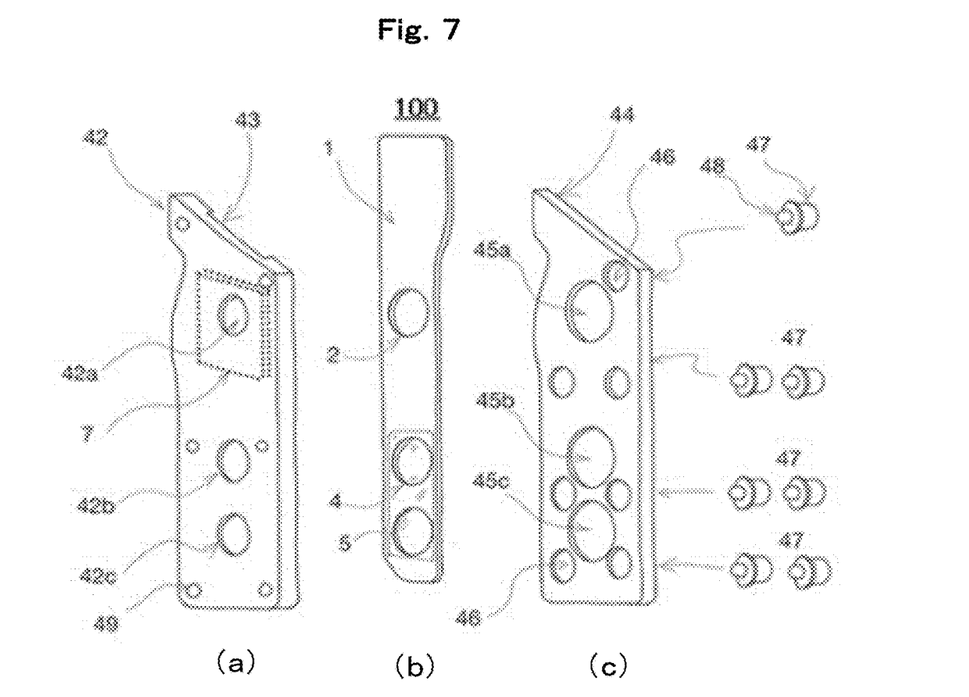
FIG. 7 is an exploded view of a spectroscopy cell and a holder.

FIG. 7 illustrates one example of an internal structure of the holder 6. In FIG. 7, the spectroscopy cell 100, a holder front portion 42, and a holder back portion 44 are illustrated in FIG. 7(b), FIG. 7(a), and FIG. 7(c), respectively. A holder window 42a, a holder window 42b, and a holder window 42c each of which is a through-hole are present in the holder front portion 42, and are provided such that the positions thereof coincide with the positions of the spectroscopy cell windows 2, 4, and 5 of the spectroscopy cell 100, respectively. The terahertz wave absorbing object 7 is bonded to an outer side of the holder window 42a. Screw holes 49 are used to connect the holder front portion 42 and the holder back portion 44. An illustration of tap holes of the holder back portion 44 that are present to correspond to the screw holes 49 is omitted.

A holder window 45a, a holder window 45b, and a holder window 45c each of which is a through-hole are present in the holder back portion 44, and are provided such that the positions thereof coincide with the positions of the spectroscopy cell windows 2, 4, and 5 of the spectroscopy cell 100, respectively.

Connection holes 46 are provided in the holder back portion 44 at a plurality of locations, and spectroscopy cell pressing units 47 (pressing mechanism) are disposed through the connection holes 46 at the plurality of locations to provide a function of correcting a distortion of the spectroscopy cell 100. The spectroscopy cell pressing unit 47 is provided with a pin 48 to be pushed out at a constant pressure by an internal spring mechanism. When the spectroscopy cell pressing units 47 are disposed in the connection holes 46 of the holder back portion 44 at the plurality of locations, a base plate of a back surface of the spectroscopy cell body portion 1 can be pressed at a constant pressure by biasing forces of the pins 48.

In consideration of a depth of the spectroscopy cell body portion 1, a depth of a groove 43 present in a back surface of the holder front portion 42 is optimized such that the pins 48 are in contact with the back surface of the base plate of the spectroscopy cell body portion 1 at an appropriate pressure when the holder front portion 42 and the holder back portion 44 are in close contact with and bonded to each other. Further, the connection hole 46 and the spectroscopy cell pressing unit 47 include a screw mechanism that is movable forward and backward, and the pressure at which the pin 48 presses the back surface of the base plate of the spectroscopy cell body portion 1 can be finely adjusted by adjusting the position of the spectroscopy cell pressing unit 47 (separation distance from the back surface of the base plate of the spectroscopy cell body portion 1) disposed in the connection hole 46.

Figure 8:
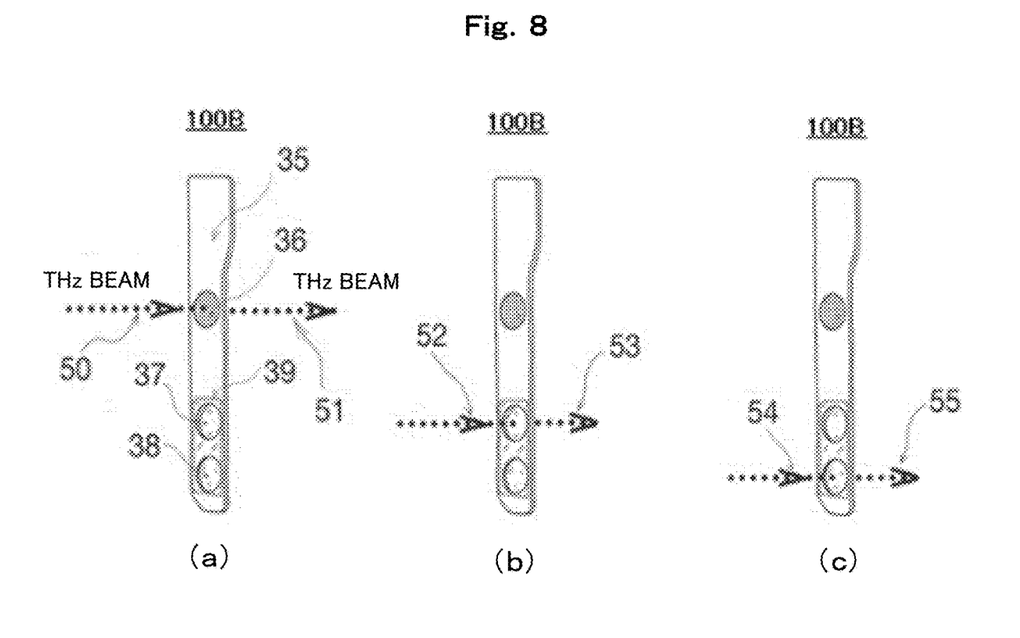
FIG. 8 is a schematic view of a positional relationship between a spectroscopy cell and a terahertz wave beam during measurement.

Examples of a calibration procedure will be described with reference to FIGS. 8 and 9. Here, an example using the spectroscopy cell 100B of FIG. 6(a) will be described. Calibration can be performed by the disposition of the spectroscopy cell pressing units 47 at any or all locations and finely adjusting the pressure of the pins 48.

During calibration, the terahertz wave absorbing object 7 is not attached to the holder 6. The spectroscopy cell body portion 35 is movable with respect to a terahertz wave beam by the holder movable unit 26, and the states of FIGS. 8(a), 8(b), and 8(c) can be created within several minutes. FIG. 8(a) illustrates a state where an incident terahertz wave beam 50 passes through the spectroscopy cell window 36, and a transmitted terahertz wave beam 51 affected by the photonic crystal structure that is a function of the spectroscopy cell window 36 is incident on the terahertz wave detecting semiconductor 28. As a result, an example of an obtained terahertz wave absorbance spectrum is illustrated in FIG. 9.

Figure 9:
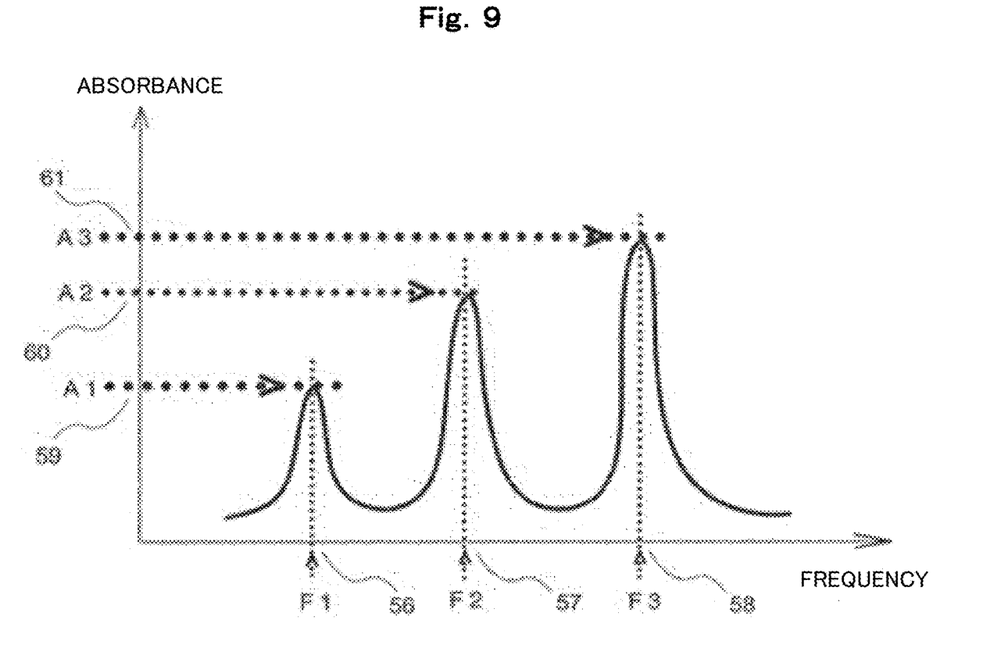
FIG. 9 is a graph illustrating an example of a terahertz wave absorption spectrum of a photonic crystal structure.

As illustrated in FIG. 9, the terahertz wave that has passed through the spectroscopy cell window 36 in which the photonic crystal structure is formed is capable of generating an absorbance spectrum having a plurality of peaks having specific peak absorbances at specific frequencies. Namely, since an index representing a known absorbance for a frequency can be obtained for each spectroscopy cell 100B, the index can be used for calibration. Certainly, only the absorbance has been described here, but similarly, calibration can also be performed for the phase difference.

Since the spectroscopy cell 100B having this characteristic is used, an absorption spectrum that is always the same within the processing accuracy of a resin molded product can be measured for each spectroscopy cell 100B, and calibration can be performed for each spectroscopy cell 100B. As a result, when a deviation or drift of a frequency or an intensity that are factors of the measuring apparatus of FIG. 4 is measured as in FIG. 8(a), calibration can be performed for each spectroscopy cell 100B each time, and more highly accurate and highly reproducible measurement can be performed.

Further, as illustrated in FIGS. 8(b) and 8(c), measurement procedures are sequentially executed, in each of which a terahertz wave beam passes through each of the spectroscopy cell window 37 and the spectroscopy cell window 38 formed in the same spectroscopy cell body portion 35. Since calibration has been already performed at the time of measurement, a to-be-measured sample can be more accurately measured. As a result, an error between individual measuring apparatuses or an error between measurement dates and times can be minimized. Certainly, as described above, since calibration is performed after terahertz signals measured by causing terahertz wave to transmit through the spectroscopy cell windows 36 to 38 are taken into the computer, the measurement procedure of FIG. 8(a) may be performed after the measurement procedure of FIG. 8(b) or FIG. 8(c), and the order is not specified.

Figure 10:
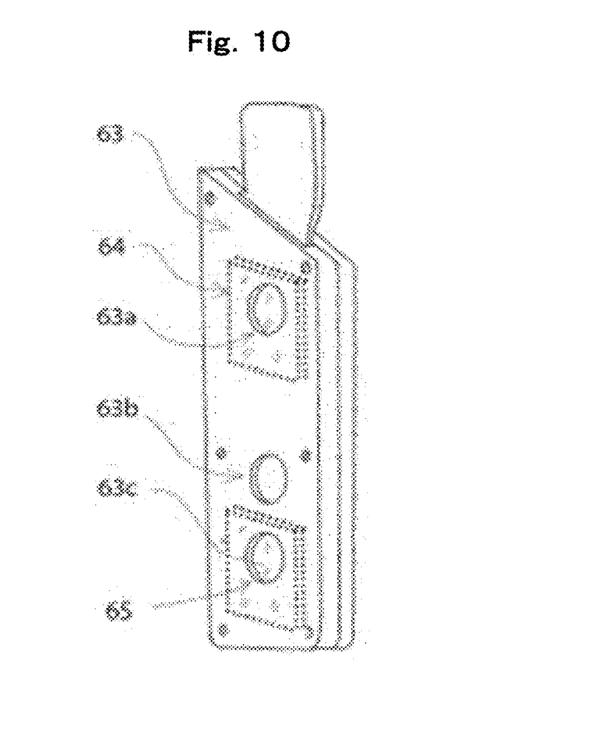
FIG. 10 is a view illustrating an example of a combination of a holder and a spectroscopy cell when two absorbing objects are affixed to the holder.

FIG. 10 illustrates an example of a holder 63 having another structure. The holder 63 is provided with two objects 64 and 65 that absorb a certain amount of a terahertz wave similarly to the terahertz wave absorbing object 7, and the holder 63 has a function of being capable of using, as calibration amounts, absorbances and phase differences dependent on two types of different frequencies by performing terahertz wave measurement. As a result, more highly accurate calibration can be performed than in the case where one terahertz wave absorbing object 7 is provided as in FIG. 2. In addition, two terahertz wave absorbing objects 64 and 65 have been described here; however, although not illustrated, a further highly accurate configuration can be obtained by disposing and using terahertz wave absorbing objects having a larger number of, for example, three or more different characteristics.

Figure 11:
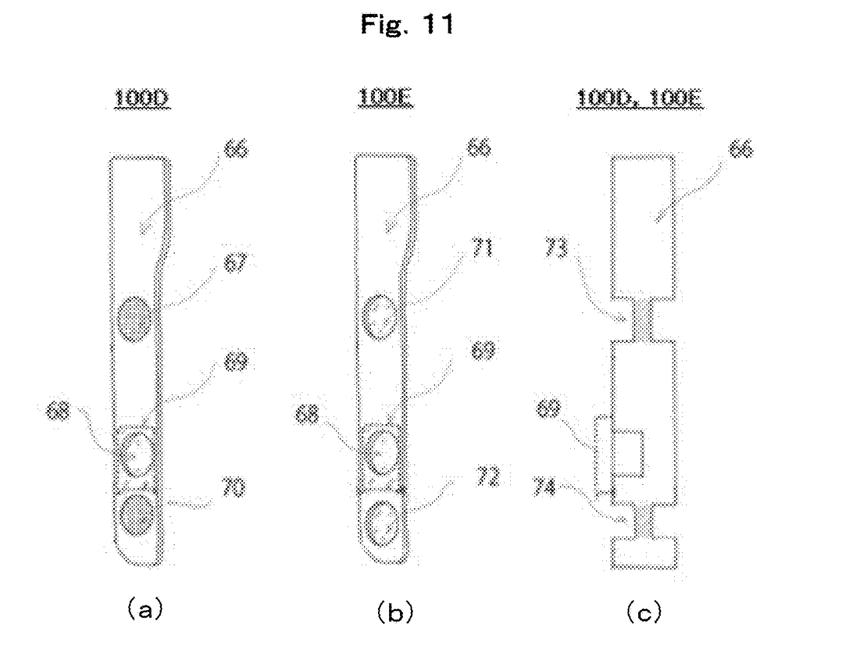
FIG. 11 illustrates examples of spectroscopy cells, each of which includes two absorbing objects.

FIG. 11 illustrates spectroscopy cells 100D and 100E having other structures. Regarding the spectroscopy cell 100D illustrated in FIG. 11(a), an uppermost spectroscopy cell window 67 and a lowermost spectroscopy cell window 70 provided in a spectroscopy cell body portion 66 are formed of an absorption reference portion 73 and an absorption reference portion 74, respectively, which are made of terahertz wave absorbing objects having different characteristics as in FIG. 11(c). Similarly, regarding the spectroscopy cell 100E illustrated in FIG. 11(b), an uppermost spectroscopy cell window 71 and a lowermost spectroscopy cell window 72 provided in the spectroscopy cell body portion 66 are formed of the absorption reference portion 73 and the absorption reference portion 74, respectively, which are made of terahertz wave absorbing objects having different characteristics as in FIG. 11(c). A spectroscopy cell window cover plate 69 is provided only for a spectroscopy cell window 68 disposed at the center.

Absorbances and phase differences of the absorption reference portion 73 and the absorption reference portion 74 which are dependent on different frequencies can be obtained as calibration amounts by performing terahertz wave measurement using the spectroscopy cells 100D and 100E configured in such a manner. As a result, more highly accurate calibration can be performed than in the case where one terahertz wave absorbing object 7 is provided as in FIG. 2. In addition, two terahertz wave absorbing objects have been described here; however, although not illustrated, a further highly accurate configuration can be obtained by disposing and using terahertz wave absorbing objects having a larger number of, for example, three or more different characteristics.

Figure 12:
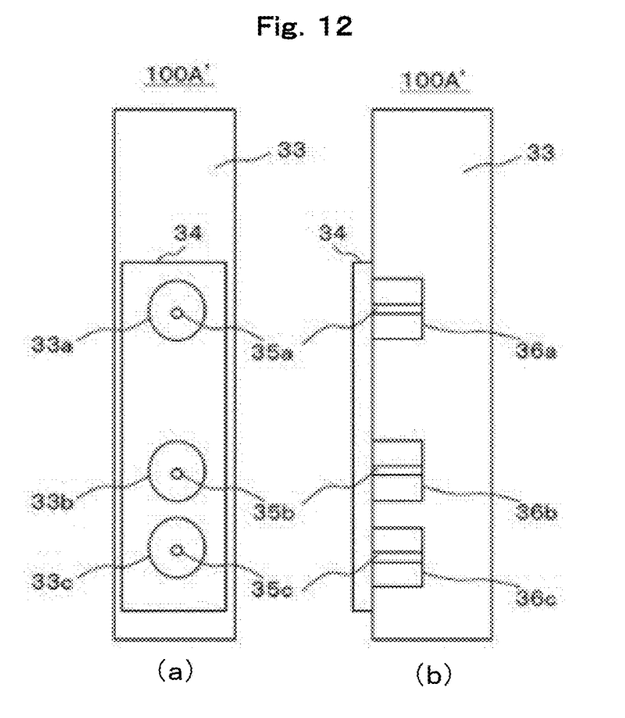
FIG. 12 illustrates an example of a spectroscopy cell.

FIG. 12 illustrates an example of a spectroscopy cell 100A' having another structure. Note that components having the same functions as those of the components illustrated in FIG. 5 are denoted by the same reference signs in FIG. 12. In the spectroscopy cell 100A' illustrated in FIG. 12, the spectroscopy cell windows 33a, 33b, and 33c are provided with columns 35a, 35b, and 35c, respectively. With this configuration, the spectroscopy cell window cover plate 34 of liquid filling portions 36a, 36b, and 36c can be prevented from being dented or protruding after the liquid filling portions 36a, 36b, and 36c are filled with a liquid. Note that a case has been described here in which the columns 35a, 35b, and 35c are provided in the configuration illustrated in FIG. 5 but similarly, the columns 35a, 35b, and 35c are also applicable to the configurations of FIGS. 3, 6, and 11.

As described in detail above, according to the embodiment, a bending of the spectroscopy cell can be mechanically corrected which are caused by plurality of factors such as bending generated during production of resin products, aging generated during storage of resin products or the other factors. Accordingly, a cell gap thickness inside the spectroscopy cell is guaranteed, and accurate spectroscopic information of a sample can be measured.

In addition, the embodiment is characterized in that in comparison between a case where one spectroscopy cell includes a plurality of filling portions and a case where one spectroscopy cell includes one filling portion, the case where the one spectroscopy cell includes the plurality of filling portions has an effect of more greatly reducing a variation in cell gap thickness between the individual filling portions, and in that accurate spectroscopic information is measured.

In addition, according to the embodiment, in a configuration of the holder and the spectroscopy cell, an object used for calibration that absorbs a certain amount of a terahertz wave is disposed in a window of the holder through which a terahertz wave beam passes, so that calibration data can be measured at the time of each measurement, and more highly accurate measurement can be performed.

Further, according to the embodiment, since a resin that is transparent in a visible light region is selected, when the spectroscopy cell is manually filled with a liquid, operability is significantly better and certainty is higher than when the spectroscopy cell is made of a non-transparent material, thereby making great contribution to industrial use sites in which inspection work is continuously performed.

Note that the example of using a liquid sample has been described in the embodiment but a gas sample or a solid sample may be used. Even in this case, the same effects as those in the case of a liquid sample can be obtained. In addition, the spectroscopy cell made of a resin material can be made not only by resin molding but also by cutting, and the same effects can also be obtained by other resin processing methods. In addition, an object that absorbs a certain amount of a terahertz wave has been described as being a solid or liquid, but is not limited thereto.

Figure 13:
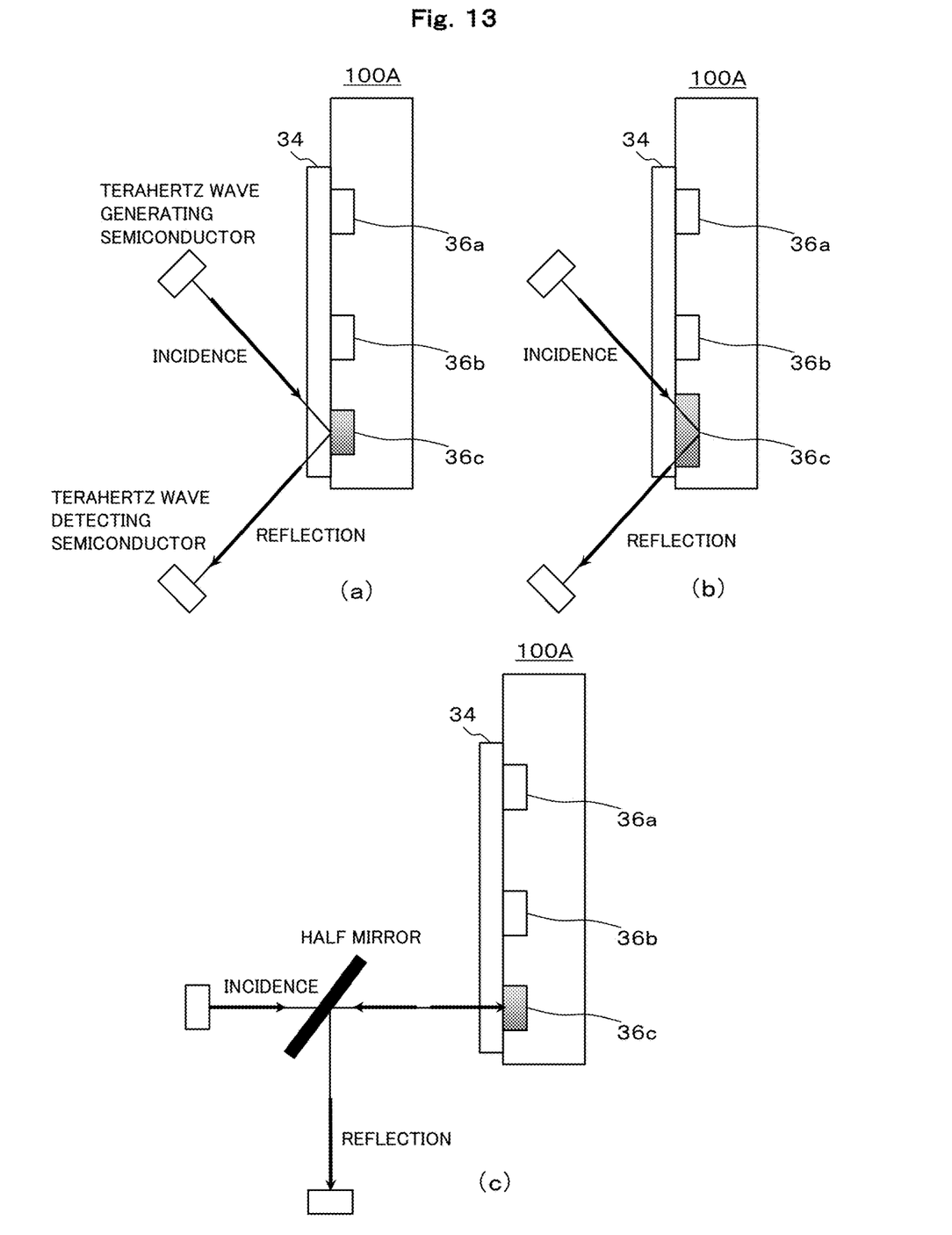
FIG. 13 is a schematic view illustrating an embodiment of reflection of a spectroscopy cell.

In addition, in the embodiment, the case has been described in which a terahertz wave passes through a to-be-measured object; however, a terahertz wave may be reflected by an to-be-measured object. FIGS. 13(a) to 13(c) schematically illustrate an embodiment of reflection. Note that components having the same functions as those of the components illustrated in FIG. 5 are denoted by the same reference signs in FIG. 13.

For example, as illustrated in FIG. 13(a), the liquid filling portion 36c of the spectroscopy cell 100A can be filled with a to-be-measured object (for example, mercury or the like) that reflects a terahertz wave, and the to-be-measured object can be measured. Note that as illustrated in FIG. 13(b), depending on a to-be-measured object with which the liquid filling portion 36c is filled, a reflective surface may also be a bottom portion of the to-be-measured object instead of a surface thereof. In addition, depending on a to-be-measured object with which the liquid filling portion 36c is filled, not only an entirety of a terahertz wave may be reflected by a surface of the to-be-measured object, but also a part of a terahertz wave may be reflected and a part thereof may transmit through the to-be-measured object. Further, multiple reflections may be repeatedly performed in a to-be-measured object.

FIG. 13(c) illustrates an example of a different reflection acquisition method. A terahertz wave is incident on a reflecting to-be-measured object after transmitting through a half mirror from the terahertz wave generating semiconductor. At the time of reflection, the terahertz wave reflected by the half mirror is detected by the terahertz wave detecting semiconductor.

Figure 14:
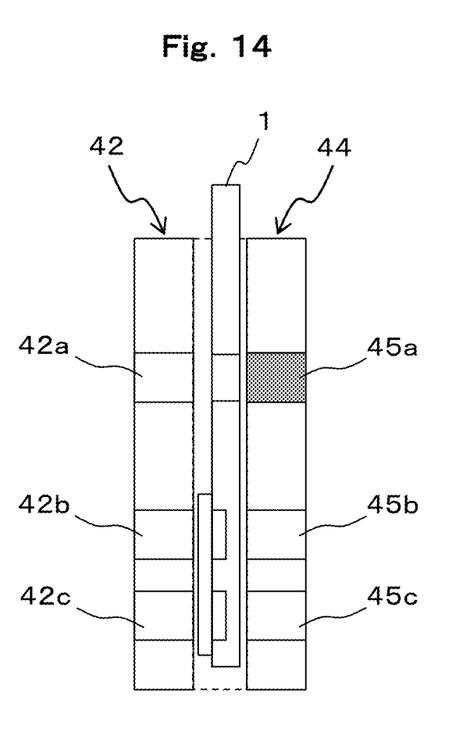
FIG. 14 is a view illustrating an example of a cross-sectional structure of a spectroscopy cell.

In addition, in the embodiment, the case has been described in which the terahertz wave absorbing object 7 is disposed in the holder 6 or the absorption reference portions 41, 73, and 74 are disposed in the spectroscopy cells 100B, 100C, 100D, and 100E; however, the invention is not limited thereto. For example, the inside of the second holder through-hole may be filled with the terahertz wave absorbing object 7. For example, as illustrated in FIG. 14, the holder window 45a provided in the holder back portion 44 may be filled with the terahertz wave absorbing object 7. Alternatively, although not illustrated, the holder window 42a provided in the holder front portion 42 may be filled with the terahertz wave absorbing object 7.

In addition, all the embodiments are merely specific examples for carrying out the invention, and the technical scope of the invention should not be interpreted as being limited thereby. Namely, the invention can be carried out in various forms without departing from the technical concept thereof or the main characteristics thereof.

INDUSTRIAL APPLICABILITY

The invention relates to the measuring jig for the spectroscopy apparatus and a calibration method thereof that improve accuracy, reproducibility, and operability in spectroscopic measurement using a terahertz wave. Until now, calibration has not been performed well, so that the use has been refrained in the industrial field, but the spectroscopy cell of the invention in which calibration is simultaneously performed significantly improves the reliability of measured values. In addition, naturally, a difference between the models of terahertz wave measuring apparatuses can be reduced as much as possible, correction between production lines or correction between factories which has been difficult to perform until now can be easily performed, which are a consistent management target within the organization. In addition, transparency in a visible light region is one of the characteristics of the invention, and the transparency significantly improves operability of a measuring worker, so that mistakes in the filling of a liquid sample can be prevented in advance or the measurement accuracy is improved, thereby making great contribution to sampling inspection at factories or the like.

REFERENCE SIGNS LIST

1 Spectroscopy cell body portion
2 Spectroscopy cell window
3 Spectroscopy cell window cover plate
4 Spectroscopy cell window
5 Spectroscopy cell window
6 Holder
6a Holder window
6b Holder window
6c Holder window
7 Object that absorbs certain amount of terahertz wave
8 Liquid filling portion
9 Bottom surface of liquid filling portion
10 Liquid filling portion
11 Cell gap thickness
12 Thickness
13 Flow path
14 Flow path
15 Liquid inlet
16 Air vent hole
17 Femtosecond laser light source
18 Sampling light
19 Laser light splitter
20 Pump light
21 Sampling light
22 Condensing lens
23 Terahertz wave generating semiconductor
24 Terahertz wave focusing unit
25 Terahertz wave
26 Holder movable unit
27 Terahertz wave focusing unit
27a Condensing mirror
28 Terahertz wave detecting semiconductor 29 Condensing lens
30 Terahertz signal detecting device
31a Reflective mirror
31b Reflective mirror
31c Reflective mirror
32 Variable optical delay unit for time delay
32a Reflective mirror
32b Reflective mirror
33 Spectroscopy cell body portion
34 Spectroscopy cell window cover plate
35 Spectroscopy cell body portion
36 Spectroscopy cell window
37 Spectroscopy cell window
38 Spectroscopy cell window
39 Spectroscopy cell window cover plate
40 Spectroscopy cell window
41 Absorption reference portion
42a Holder window
42b Holder window
42c Holder window
43 Groove present in back surface of holder front portion
44 Holder back portion
45a Holder window
45b Holder window
45c Holder window
46 Connection hole
47 Spectroscopy cell pressing unit
48 Pin
49 Screw hole
50 Incident terahertz wave beam
51 Transmitted terahertz wave beam
52 Incident terahertz wave beam
53 Transmitted terahertz wave beam
54 Incident terahertz wave beam
55 Transmitted terahertz wave beam
56 Reference frequency 1
57 Reference frequency 2
58 Reference frequency 3
59 Reference absorbance 1
60 Reference absorbance 2
61 Reference absorbance 3
62 Spectroscopy cell
63 Holder
63a Holder window
63b Holder window
63c Holder window
64 Object that absorbs certain amount of terahertz wave
65 Object that absorbs certain amount of terahertz wave
66 Spectroscopy cell
67 Spectroscopy cell window
68 Spectroscopy cell window
69 Spectroscopy cell window cover plate
70 Spectroscopy cell window
71 Spectroscopy cell window
72 Spectroscopy cell window
73 Absorption reference portion
74 Absorption reference portion
100, 100A to 100E Spectroscopy cell

The invention claimed is:
1. A measuring jig to be used in a terahertz wave spectroscopy apparatus, the jig comprising:
a spectroscopy cell as a container including one or more spaces, each of which has a plate shape and contains a to-be-measured object that transmits or reflects a terahertz wave; and
a holder including one or more first holder through-holes disposed at positions corresponding to the spaces of the spectroscopy cell, each of the spaces containing the to-be-measured object,
wherein the spectroscopy cell is made of a resin material that transmits the terahertz wave, and the spectroscopy cell is loaded into the holder and is used, and
the holder has a function of holding the spectroscopy cell, and a function of correcting one or more of a distortion, a twist, and a bending of the spectroscopy cell,
the spectroscopy cell further includes a cell through-hole other than the spaces, each of which contains the to-be-measured object, and
the holder further includes a second holder through-hole disposed at a position corresponding to the cell through-hole.

2. The measuring jig according to claim 1 characterized in that,
an object that absorbs a certain amount of the terahertz wave is disposed with respect to the second holder through-hole.

3. The measuring jig according to claim 2 characterized in that,
the object that absorbs a certain amount of the terahertz wave is disposed outside the second holder through-hole and is bonded to the holder.

4. The measuring jig according to claim 2 characterized in that,
an inside of the second holder through-hole is filled with the object that absorbs a certain amount of the terahertz wave.

5. The measuring jig according to claim 2 characterized in that,
the object that absorbs a certain amount of the terahertz wave has a photonic crystal structure.

6. The measuring jig according to claim 1 characterized in that,
an object that absorbs a certain amount of the terahertz wave is disposed inside the cell through-hole.

7. The measuring jig according to claim 6 characterized in that,
the object that absorbs a certain amount of the terahertz wave is formed of an absorption reference portion having a photonic crystal structure molded of the same resin material as a material molding a spectroscopy cell body portion.

8. The measuring jig according to claim 6 characterized in that,
the object that absorbs a certain amount of the terahertz wave has a photonic crystal structure.

9. The measuring jig according to claim 1 characterized in that,
the spectroscopy cell includes at least two cell through-holes, and objects that absorb a certain amount of different types of terahertz waves are disposed in the at least two cell through-holes.

10. The measuring jig according to claim 9 characterized in that,
at least one of the objects that absorb a certain amount of the different types of terahertz waves has a photonic crystal structure, and when two or more photonic crystal structures are present, the two or more photonic crystal structures are all different from each other.

11. The measuring jig according to claim 1 characterized in that,
the holder has a function of attaching and detaching the spectroscopy cell.

12. The measuring jig according to claim 1 characterized in that,
the spectroscopy cell includes a plurality of the spaces, each of which contains the to-be-measured object, and includes one cell through-hole, and
the plurality of spaces, each of which contains the to-be-measured object, are disposed side by side without interposing the cell through-hole between the plurality of spaces.

13. A terahertz wave measuring method characterized in that,
the measuring jig according to claim 1 is installed in a middle of a terahertz wave optical path of a terahertz wave spectroscopy apparatus, and a characteristic of a to-be-measured object is spectroscopically measured by the terahertz wave spectroscopy apparatus.

14. A calibration method characterized in that,
the measuring jig according to claim 1 is installed in a middle of a terahertz wave optical path of a terahertz wave spectroscopy apparatus, a characteristic of a measurement to-be-measured object is spectroscopically measured by the terahertz wave spectroscopy apparatus, and at least one of a transmittance, a reflectance, a phase difference, an intensity, and a phase is used as a calibration amount.

15. A measuring jig to be used in a terahertz wave spectroscopy apparatus, the jig comprising:
a spectroscopy cell as a container including one or more spaces, each of which has a plate shape and contains a to-be-measured object that transmits or reflects a terahertz wave; and
a holder including one or more first holder through-holes disposed at positions corresponding to the spaces of the spectroscopy cell, each of the spaces containing the to-be-measured object,
wherein the spectroscopy cell is made of a resin material that transmits the terahertz wave, and the spectroscopy cell is loaded into the holder and is used, and
the holder has a function of holding the spectroscopy cell, and a function of correcting one or more of a distortion, a twist, and a bending of the spectroscopy cell,
the holder includes pressing mechanisms disposed in a holder back portion at a plurality of locations as a function of correcting one or more of the distortion, the twist, and the bending of the spectroscopy cell, and
each of the pressing mechanisms presses a spectroscopy cell body portion with a pin pushed out by a biasing force of an internal spring mechanism.

16. The measuring jig according to claim 15 characterized in that,
the pressing mechanisms are disposed in connection holes provided in the holder back portion at a plurality of locations, and
the pressing mechanism and the connection hole are configured such that a position of the pressing mechanism disposed in the connection hole is adjustable by a screw mechanism, and the pin is configured to be adjustable finely a pressure to press the spectroscopy cell body portion.

* * * * *